March 23, 1926.
A. J. KERCHER
1,577,862
PRESSURE CONTROLLING DEVICE
Filed Oct. 9, 1922
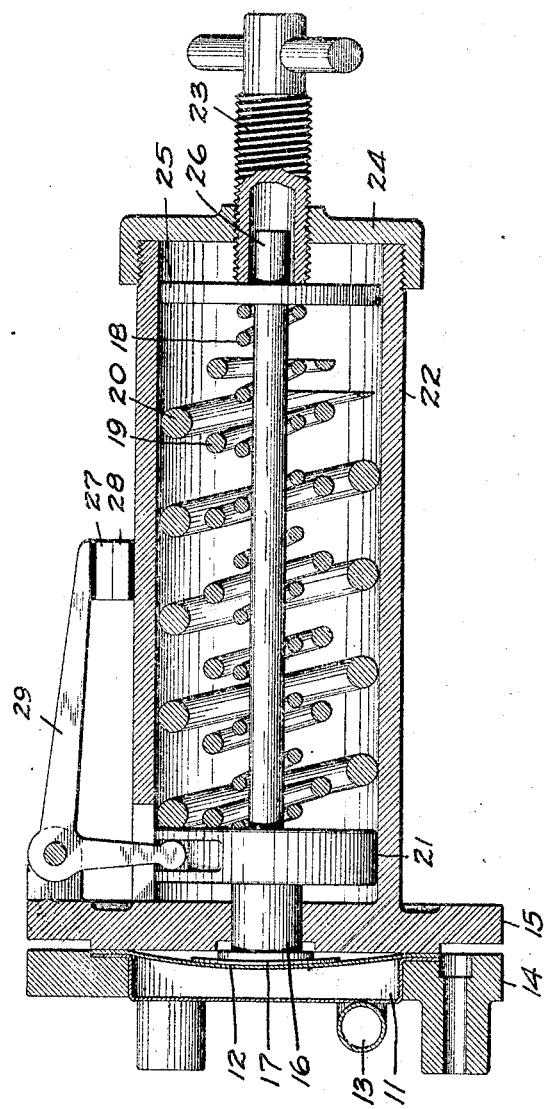
WITNESS:
H. Sherburne
INVENTOR.
ARTHUR J. KERCHER.
BY White Prost Evans
his ATTORNEYS.

Patented Mar. 23, 1926.

1,577,862

UNITED STATES PATENT OFFICE.

ARTHUR J. KERCHER, OF BERKELEY, CALIFORNIA.

PRESSURE-CONTROLLING DEVICE.

Application filed October 9, 1922. Serial No. 593,470.

*To all whom it may concern:*

Be it known that I, ARTHUR J. KERCHER, a citizen of the United States, and a resident of the city of Berkeley, in the county of Alameda and State of California, am the inventor of a new and useful Pressure-Controlling Device, of which the following is a specification.

My invention relates to pressure control devices, such as cells utilizing a volatile liquid for controlling conditions of pressure or temperature.

It is one of the objects of my invention to provide a pressure cell having a diaphragm so arranged that the point at which control begins may be easily adjusted, without the necessity of more than a limited physical adjustment, as by turning a thumb piece through a relatively small angle.

Another object of my invention is to arrange a force exerting means such as a spring, so as to vary the pressure exerted thereby through a considerable range with only a limited adjusting movement, and furthermore to cause a relatively small variation in pressure at one extreme of the adjustment, but a much larger variation at the other extreme of the adjustment.

My invention possesses other advantageous features, some of which, with the foregoing, will be set forth at length in the following description where I shall outline in full that embodiment of my invention which I have selected for illustration in the drawings accompanying and forming part of the present specification. In the drawings, I have shown but one form of my invention, but it is to be understood that I do not limit myself to that form, since the invention as expressed in the claims may be embodied in other forms as well.

Referring to the drawings, the single figure is a longitudinal sectional view of a pressure control mechanism embodying my invention.

A pressure cell 11 having a buckled diaphragm 12 is shown in the present instance as the element that responds to pressure variations in order to perform a controlling or regulating function. The interior of this pressure cell is adapted to be connected, as by a passage 13, with a container holding a volatile liquid, such as ether or the like. This container may be disposed in any appropriate fashion for responding to the pressure or temperature which it is desired to control. For example, it may be located within an oven. The cell 11 may be held between two members, 14 and 15, preferably castings. The volatilization of the liquid in the container tends to urge the diaphragm 12 toward the right, and to push the plunger 16 in that direction. Interposed between the plunger and the diaphragm is a thin metallic member 17, which has the effect of properly distributing the force acting on the diaphragm 12.

The plunger 16, which is appropriately guided in the member 15, is urged by a force opposing that of the pressure in the cell, toward the left. This force may be most conveniently produced by adjustable resilient elements, such as the springs 18, 19 and 20. These springs act against the collar 21 fixed to the plunger 16, and guided in the long tube-like extension 22 of the member 15. The force exerted by the springs is adjustable, as by aid of a thumb screw 23, so that the point at which a regulating function occurs may be varied. The thumb screw is shown as threaded in a plate 24, covering the opening of the extension 22. The thumb screw 23 engages a collar 25 guided in the extension, through which passes the plunger rod 26.

The springs 18, 19 and 20 are appropriately designed to produce the desired range of pressure which may be exerted against the plunger 16. As may be readily seen in the drawing, spring 18 has the longest free length, while springs 19 and 20 have progressively shorter lengths. In this way, when pressure is first applied against the plunger 16 by turning thumb screw 23, the spring 18 alone is active. As the thumb screw is turned further in to increase the pressure, the other two springs come into play to add their pressure to that already existing. In this way, the total travel of the thumb screw may be made small, and at the same time a very wide range may be had in the force opposing that of the gas pressure in the cell 11. The length of the thumb screw may be kept within reasonable limits. The effect of the plurality of springs is markedly different from that of a single stiff spring, since in the present case it is possible to have a comparatively small variation of pressure per turn of the thumb-screw when the pressure is just being applied. This variation in pressure per turn is materially increased every time a new spring becomes active, so that over the entire range of adjustment, a comparatively small movement of the thumb screw is necessary. Such a result is especially useful in connection with pressure cells of the sort described. In such cells, a comparatively large variation in pressure results in response to temperature variations when the limits of the temperature variation represent a high degree of heat.

By adjusting the thumb screw 23 by the desired amount, it is possible to control the point at which the cell functions to perform a regulating act. Thus for example when the oven temperature reaches a predetermined value, the diaphragm 12 overcomes the force of the springs and may operate a pair of contacts 27 and 28, placed in a control circuit. One of the contacts such as 27 may be mounted on a movable lever 29 and the other on a stationary part of the apparatus. One arm of lever 29 may be placed in the path of movement of the collar 21 as the diaphragm urges it to the left, and in this way, the contacts may be operated.

I claim:

1. In combination, a pressure cell having a diaphragm and means for causing a force to be exerted opposed to the pressure of the cell comprising a plurality of resilient members, and adjustable means for successively bringing these resilient members into operation.

2. In combination, a pressure cell having a diaphragm, a plurality of resilient members arranged to exert a force against the pressure exerted on the diaphragm, and means for adjusting this opposing force, movable to engage in succession said resilient members to individually adjust the same.

3. In combination, a pressure cell having a diaphragm, a plurality of helical springs of unequal free lengths arranged to exert a force against the pressure exerted on the diaphragm and means for adjustably compressing the springs against the diaphragm, whereby these springs are rendered active in succession.

In testimony whereof, I have hereunto set my hand.

ARTHUR J. KERCHER.